US009962655B2

(12) United States Patent
Baek et al.

(10) Patent No.: US 9,962,655 B2
(45) Date of Patent: May 8, 2018

(54) ACID GAS CAPTURE SYSTEM AND METHOD SAVING ENERGY BY COOLING ABSORBENT, WHICH HAS PASSED REBOILER, BY MEANS OF STEAM CONDENSATE

(71) Applicant: KOREA INSTITUTE OF ENERGY RESEARCH, Daejeon (KR)

(72) Inventors: Il Hyun Baek, Daejeon (KR); Jong Kyun You, Daejeon (KR); Ki-Tae Park, Daejeon (KR); SeongKi Lee, Seoul (KR); YongWoon Lee, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 81 days.

(21) Appl. No.: 15/123,982

(22) PCT Filed: Mar. 7, 2014

(86) PCT No.: PCT/KR2014/001896
§ 371 (c)(1),
(2) Date: Sep. 6, 2016

(87) PCT Pub. No.: WO2015/133665
PCT Pub. Date: Sep. 11, 2015

(65) Prior Publication Data
US 2017/0014767 A1   Jan. 19, 2017

(30) Foreign Application Priority Data
Mar. 6, 2014   (KR) .................. 10-2014-0026666

(51) Int. Cl.
*B01D 53/96*   (2006.01)
*B01D 53/14*   (2006.01)
(Continued)

(52) U.S. Cl.
CPC ......... *B01D 53/96* (2013.01); *B01D 53/1425* (2013.01); *B01D 53/1456* (2013.01);
(Continued)

(58) Field of Classification Search
None
See application file for complete search history.

(56) References Cited

FOREIGN PATENT DOCUMENTS

| JP | 2010-538821 A | 12/2010 |
|---|---|---|
| KR | 10-2008-0052547 A | 6/2008 |

(Continued)

OTHER PUBLICATIONS

International Search Report dated Nov. 24, 2014 of PCT/KR2014/001896 which is the parent application and its English translation—4 pages.

(Continued)

*Primary Examiner* — Daniel Berns
(74) *Attorney, Agent, or Firm* — Knobbe Martens Olson & Bear LLP

(57) ABSTRACT

The present invention relates to a system and a method therefor capable of reducing the amount of heat which must be supplied to a regeneration tower for regenerating an absorbent in an acid gas capture system for such acid gas as carbon dioxide, and provides an acid gas capture system and an acid gas capture method capable of reducing energy consumption by using the heat from the system itself in an acid gas capture system. The system and method according to the present invention have the benefit of saving energy by lowering the thermal demand of a reboiler by using the low-temperature steam condensate generated in the capture system to cool the upper end of the regeneration tower and a steam generator and compressor.

7 Claims, 2 Drawing Sheets

(51) Int. Cl.
    *B01D 53/40*     (2006.01)
    *B01D 53/48*     (2006.01)
    *B01D 53/52*     (2006.01)
    *B01D 53/62*     (2006.01)
    *B01D 53/72*     (2006.01)
    *B01D 53/78*     (2006.01)
    *B01D 53/34*     (2006.01)
    *F01N 3/08*     (2006.01)
    *B01D 53/18*     (2006.01)

(52) U.S. Cl.
    CPC ..... *B01D 53/1468* (2013.01); *B01D 53/1475* (2013.01); *B01D 53/18* (2013.01); *B01D 53/343* (2013.01); *B01D 53/40* (2013.01); *B01D 53/48* (2013.01); *B01D 53/52* (2013.01); *B01D 53/62* (2013.01); *B01D 53/72* (2013.01); *B01D 53/78* (2013.01); *B01D 2252/204* (2013.01); *B01D 2257/304* (2013.01); *B01D 2257/306* (2013.01); *B01D 2257/308* (2013.01); *B01D 2257/504* (2013.01); *B01D 2257/7025* (2013.01); *Y02C 20/20* (2013.01)

(56) References Cited

FOREIGN PATENT DOCUMENTS

| KR | 10-2009-0008270 A | 1/2009 |
| KR | 10-2010-0092967 A | 8/2010 |
| KR | 10-0983677 B1 | 9/2010 |
| KR | 10-2012-0000979 A | 1/2012 |

OTHER PUBLICATIONS

Park, "Carbon Dioxide Capture and Storage Technology", Physics and high technology, Jun. 2009, pp. 19-23.

ACID GAS CAPTURE SYSTEM AND METHOD SAVING ENERGY BY COOLING ABSORBENT, WHICH HAS PASSED REBOILER, BY MEANS OF STEAM CONDENSATE

TECHNICAL FIELD

The present invention relates to an acid gas capture process, and more particularly, to an energy-saving acid gas capture system and method using condensate.

BACKGROUND ART

The concentration increase of acid gas such as carbon dioxide ($CO_2$), methane ($CH_4$), hydrogen sulfide ($H_2S$), carbonyl sulfide (COS) or the like in the air from the use of fossil fuel is causing global warming. In particular, reducing the concentration of carbon dioxide in the air has been actively discussed worldwide in various aspects since the Rio De Janeiro Environmental Conference in 1992.

Carbon dioxide capture and storage (CCS) technologies are isolating carbon dioxide discharged in large quantity from power plants, steel plants or cement plants from the air.

In particular, carbon dioxide capture in CCS technologies is considered a core technology that takes about 70% to about 80% of the overall costs, which may be classified into post-combustion technology, pre-combustion technology, and oxy-fuel combustion technology (refer to "Carbon Dioxide Capture and Storage Technology", by Sang-do Park, Physics and High Technology, June, 2009).

Post-combustion technology is isolating carbon dioxide ($CO_2$) produced from the combustion of fossil fuel by absorbing or reacting the carbon dioxide ($CO_2$) with various solvents. Pre-combustion technology is capturing carbon dioxide ($CO_2$) in exhaust gas before the combustion by pre-treating fossil fuel such as coal, for example, via gasification into carbon dioxide ($CO_2$) and hydrogen ($H_2$), and then isolating the carbon dioxide ($CO_2$) from the mixed gas of carbon dioxide ($CO_2$) and hydrogen ($H_2$) or combusting the mixed gas. Oxy-fuel combustion technology is combusting fossil fuel with only pure oxygen instead of air, thereby to easily capture carbon dioxide ($CO_2$). Post-combustion technology of the above-described technologies is currently most widely used.

Post-combustion technology is the most easy to apply with existing carbon dioxide sources, which isolates carbon dioxide by adsorbing or desorbing carbon dioxide with absorbent, focusing on performance improvement of the absorbent and process improvement therefor. This post-combustion technology includes wet absorption and dry absorption technologies that are currently in commercial use to supply carbon dioxide required for automatic welding or producing urea fertilizer or carbonated drinks. Wet absorption technology may have higher efficiency than dry absorption technology.

A typical wet absorption process is a capture process using amine-based absorbent. This process has been used in a modification process involved in petrochemical processes with ensured technical reliability, but still needs further improvement in terms of absorbent performance and process improvement in order to be applicable with flue gas including various contaminants. As a process using amine-based absorbent, a chemical absorption process using an alkanolamine absorbent that includes both amine and hydroxyl groups bound to an alkyl group may be performed using a system equipped with an absorption tower for selectively absorbing carbon dioxide from inflow gas, a regeneration tower (hot regeneration tower) for regenerating the carbon dioxide-absorbed absorbent, and other accessory equipments.

Monoethanolamine (MEA), as a most widely used amine-based absorbent, has alkaline properties due to unshared electrons in amine groups, which may cause acid-base neutralization reaction with acidic carbon dioxide. Furthermore, salts (carbamate or bicarbonate) as reaction products may be decomposed at a temperature of about 110° C. to about 130° C. to be regenerated. The ability to absorb carbon dioxide ($CO_2$) and the absorption rate of an absorbent may vary according to structural characteristics of amines used in the absorbent.

A carbon dioxide absorption process may be performed at about 40° C. to about 50° C., while a regeneration process may be performed at about 110° C. to about 130° C. Accordingly, part of the absorbent may vaporize during the regeneration process and be discharged together with carbon dioxide. In this regard, there is a need for preheating technologies to reduce the heat duty of such as a cooler for cooling and condensing the vaporized absorbent and a reboiler in the regeneration process.

Korean Patent No. 0983677 relates to a system and method of absorbing and separating acid gas, wherein using steam generated in a boiler as a heat source for absorbent regeneration is disclosed. However, using the generated steam only for absorbent regeneration still has limitations.

Therefore, there is a need for the development of technologies to reduce the energy consumption in heating and cooling of the regeneration process.

PRIOR ART DOCUMENTS

Patent Document

Korean Patent No. 0983677

Non-Patent Document

"Carbon Dioxide Capture and Storage Technology", by Sang-do Park, Physics and High Technology, June, 2009

DETAILED DESCRIPTION OF THE INVENTION

Technical Problem

The present invention provides an acid gas capture system and method capable of reducing the energy consumption by using a condensate generated in the acid gas capture system for heat exchange in the acid gas capture system.

Technical Solution

To address the above-described drawbacks, the inventors of the present invention found that the energy efficiency of an acid gas capture system may be improved by providing vapor generated through heat exchange of a condensate discharged from the acid gas capture system with a high-temperature regenerated absorbent in liquid form discharged from a regeneration tower, so that the present invention was completed.

According to an aspect of the present invention, there is provided an acid gas capture system of saving energy by cooling an absorbent that has passed through a reboiler with a condensate, the system including: an absorption tower that absorbs the acid gas with an absorbent; a regeneration tower that isolates a processed gas free of the absorbent; an exhaust gas supply line through which an acid gas-included exhaust gas passed through a first heat exchanger and a water separator is supplied to an absorption tower; an absorbent supply line through which the acid gas-absorbed absorbent discharged from the absorption tower is supplied to the regeneration tower through a second heat exchanger; a processed gas supply line through which the processed gas discharged from the regeneration tower is supplied to a condenser via a third heat exchanger; and a condensate supply line through which a condensate discharged from the condenser is supplied to regeneration tower, wherein the condensate supply line is branched off into three lines including: a first condensate supply line through which the condensate generated in the condenser is directly supplied to the regeneration tower; a second condensate supply line through which the condensate generated in the condenser is supplied to a fourth heat exchanger and generated vapor is supplied to the regeneration tower via a compressor; and a third condensate supply line through which the condensate generated in the condenser is supplied to the compressor to cool the vapor.

In some embodiments, an operating temperature of the condenser may be from about 30° C. to about 40° C.

In some embodiments, the acid gas may be carbon dioxide ($CO_2$), methane ($CH_4$), hydrogen sulfide ($H_2S$), carbonyl sulfide (COS), or mercaptane (RSH, wherein R is a hydrocarbon).

In some embodiments, the absorbent supply line and a regenerated absorbent supply line for transferring a regenerated absorbent to the absorption tower via a reboiler connected to a lower part of the regeneration tower may intersect with each other in the second heat exchanger.

According to another aspect of the present invention, there is provided an acid gas capture method of saving energy by cooling an absorbent that has passed through a reboiler using a condensate by using an absorption tower for absorbing an acid gas with an absorbent and a regeneration tower for isolating a processed gas free of the absorbent, the method including: supplying an exhaust gas including an acid gas to the absorption tower to absorb the acid gas with the absorbent; supplying an acid gas-absorbed absorbent discharged from the absorption tower to the regeneration tower to isolate the acid gas from the absorbent; supplying a processed gas discharged from the regeneration tower to a condenser to isolate a condensate from the processed gas; and supplying the condensate generated passing through the condenser to a condensate supply line, wherein the supplying of the condensate includes: cooling the regeneration tower by supplying the condensate generated in the condenser to an upper part of the regeneration tower; cooling a regenerated adsorbent generated in the regeneration tower by supplying the condensate generated in the condenser to a fourth heat exchanger, and supplying generated vapor to a compressor prior to supplying the vapor to the regeneration tower; and cooling the vapor in the compressor by supplying the condensate generated in the condenser to the compressor prior to supplying the vapor to the regeneration tower.

In some embodiments of the acid gas capture method, an operating temperature of the condenser may be from about 30° C. to about 40° C.

In some embodiments of the acid gas capture method, the acid gas may be carbon dioxide ($CO_2$), methane ($CH_4$), hydrogen sulfide ($H_2S$), carbonyl sulfide (COS), or mercaptane (RSH, wherein R is a hydrocarbon).

Advantageous Effects

As described above, according to the one or more embodiments, an acid gas capture system and method may branch off a low-temperature condensate water into condensate streams, which may be used for cooling an upper part of the regeneration tower, vapor generation, and cooling a compressor. Vapor generated by recovering the heat of the high-temperature absorbent in liquid form discharged from the regeneration tower may be supplied to the regeneration tower, so that the reboiler heat duty may be lowered. The cooling of the upper part of the regeneration tower may also reduce the energy requirement for the condenser.

EMBODIMENTS

Figure 1:
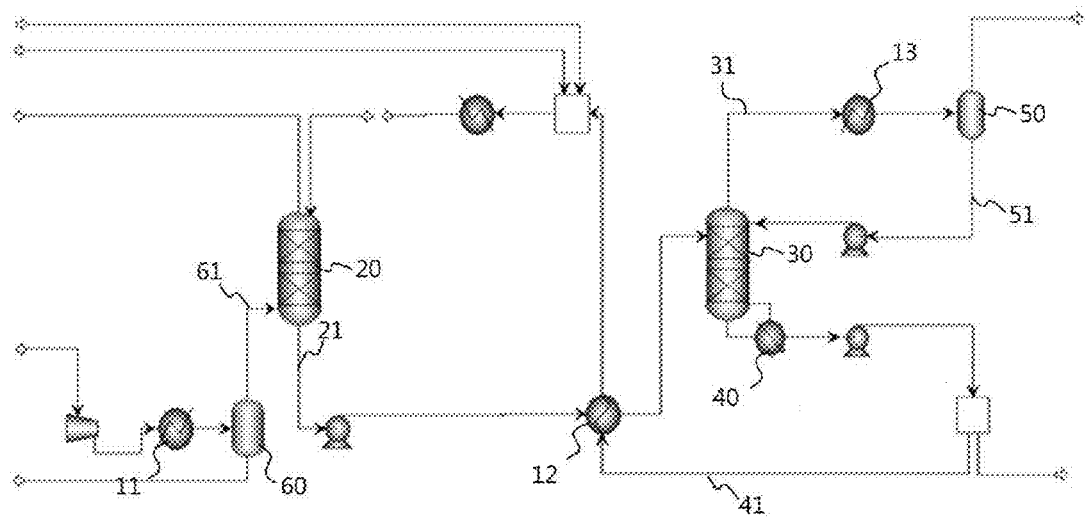
FIG. 1 illustrates a conventional acid gas capture system.

One or more embodiments of an acid gas capture system and method now will be described more fully hereinafter with reference to the accompanying drawings, in which illustrative embodiments of the invention are shown. However, this invention should not be construed as limited to the embodiments set forth herein, and may be embodied in many different forms without departing from the principles and spirit of the invention, the scope of which is defined in the claims and their equivalents.

In the drawings illustrating embodiments of the present invention, like numbers refer to like elements throughout, and detailed description of the same or like elements are not repeated.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Absorbent, processed gas, or condensate transport (supply or discharge) lines that may exchange heat with one another are described herein as "intersecting with each other" at a heat exchanger for heat exchanging. In other words, two of these fluid supply lines may intersect with each other in a heat exchanger for heat exchange with each other.

FIG. 1 illustrates a conventional acid gas capture system. In the conventional acid gas capture system of FIG. 1, an exhaust gas including an acid gas such as carbon dioxide may be supplied to an absorption tower 20 filled with filling matter having a large surface area to facilitate contact between gas and liquid, to contact an absorbent in liquid form that may be sprayed in an upper part of the absorption tower 20 under an atmospheric condition. The contacting between the exhaust gas and the absorbent may be performed at a temperature of about 40° C. to about 50° C., so that the acid gas such as carbon dioxide in the exhaust gas may be absorbed into the absorbent in liquid form.

The absorbent discharged from the absorption tower 20, i.e., the absorbent which has absorbed the acid gas such as carbon dioxide (also referred to herein as "acid gas-absorbed adsorbent"), may be transported to a regeneration tower 30, and then thermally treated at a temperature of about 120° C., so that a processed gas that is free of the absorbent may be obtained. Then, the processed gas free of the absorbent may be discharged through an upper part of the regeneration tower 30, while the regenerated absorbent free of the processed gas may be recirculated by being supplied back to the absorption tower 20 via a reboiler 40. The processed gas discharged from the regeneration tower 30 may be supplied to a condenser 50 via a processed gas discharge line 31. The condenser 50 may condense part of vapor into water so that the vapor remaining uncondensed and acid gas such as carbon dioxide may be obtained as final products. The condensate (condensate water) may be supplied back to the regeneration tower 30 via a condensate supply line 51 for reuse. The recirculating of the condensate may improve the isolation efficiency of the regeneration tower 30 but may also increase the heat duty of the reboiler 40 due to the inflow of the low-temperature condensate. The regenerated absorbent may be transported through a regenerated absorbent supply line 41 to preheat the acid gas-absorbed absorbent that is to be supplied to the regeneration tower 30 via the second heat exchanger 12, and to be supplied back to the absorption tower 20 in order to absorb newly supplied acid gas. The regenerated absorbent supply line 41 may intersect with an absorbent supply line 21 at the second heat exchanger 20, wherein the absorbent supply line 21 may supply the acid gas-absorbed absorbent from the absorption tower 20 to the regeneration tower 30 in the first heat exchanger 10.

Figure 2:
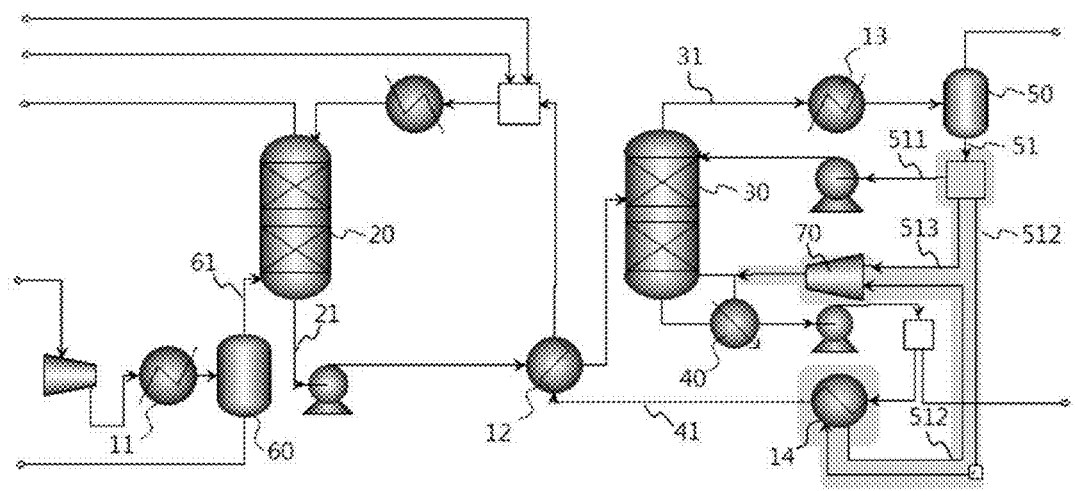
FIG. 2 illustrates an acid gas capture system according to an embodiment of the present invention.

FIG. 2 illustrates an acid gas capture system according to an embodiment of the present invention. The acid gas capture system of FIG. 2 may include an absorption tower 20 for absorbing acid gas with an absorbent and a regeneration tower 30 for isolating a processed gas free of the absorbent. The acid gas capture system of FIG. 2 may include an exhaust gas supply line 61 through which an exhaust gas including an acid gas that has passed through a first heat exchanger 11 and a water separator 60 may be supplied to an absorption tower 20; an absorption tower 20; an absorbent supply line 41 through which the acid gas-absorbed absorbent may be supplied from the absorption tower 20 to the regeneration tower 30 through a second heat exchanger 12; a processed gas discharge line 31 through which the processed gas discharged from the regeneration tower 30 may be supplied to a condenser 50 via a third heat exchanger 13; and a condensate supply line 51 through which a condensate (condensate water) discharged from the condenser 50 may be supplied to regeneration tower. The condensate supply line 51 may be branched off into three lines including: a first condensate supply line 511 through which the condensate generated in the condenser 50 may be directly supplied to the regeneration tower 30; a second condensate supply line 512 through which the condensate generated in the condenser 50 may be supplied to a fourth heat exchanger 14 and generated vapor may be supplied to the regeneration tower 30 via a compressor 70; and a third condensate supply line 513 through which the condensate generated in the condenser 50 may be supplied to the compressor 70 to cool the vapor. In some embodiments, an operating temperature of the condenser 50 may be from about 30° C. to about 40° C. In some embodiments, the acid gas may be selected from carbon dioxide ($CO_2$), methane ($CH_4$), hydrogen sulfide ($H_2S$), carbonyl sulfide (COS), or mercaptane (RSH, wherein R is a hydrocarbon). However, embodiments are not limited thereto.

The regeneration tower 30 may isolate the acid gas from the acid gas-absorbed absorbent in liquid form discharged from the absorption tower 20 by supplying heat to the acid gas-absorbed absorbent in liquid form. A heat medium of the regeneration tower 30 is vapor supplied to a lower part of the regeneration tower 30 from the reboiler 40. The supplied vapor may continuously supply heat to the acid gas-absorbed absorbent in liquid form while the vapor rises to an upper part of the regeneration tower 30 from the lower part of the regeneration tower 30. When the acid gas is isolated from the absorbent by the heat supply, the regenerated absorbent may flow downward, and the isolated acid gas and vapor may be discharged via the processed gas discharge line 31 that is connected to the upper part of the regeneration tower 30, and be supplied to the condenser 50 via the third heat exchanger 13.

To reduce the reboiler heat duty, it is important to recover the energy of the high-temperature regenerated absorbent in liquid form discharged from the regeneration tower 30 as much as possible. According to embodiments of the present invention, the condensate from the condenser 50 may be branched off into condensate streams, which may be used for cooling the upper part of the regeneration tower 30, vapor generation, and cooling the compressor 70, so that the reboiler heat duty may be reduced.

The first condensate supply line 511 as one of the three branched condensate supply lines may directly supply the condensate generated in the condenser 50 to the upper part of the regeneration tower 30 to cool the upper part of the regeneration tower 30. For example, the upper part of the regeneration tower 30 may be cooled down to about 96° C., below the temperature (100° C.) of the upper part of the regeneration tower 30 at which a conventional amine process is performed, so that the condensation heat energy of the condenser 50 may be reduced.

The second condensate supply line 512 and the third condensate supply line 513 are related with the heat recovery of the high-temperature regenerated absorbent in liquid form discharged from the lower part of the regeneration tower 20. The second condensate supply line 512 may recover the heat of the regenerated absorbent in liquid form discharged from the regeneration tower 30 by supplying the condensate generated in the condenser 50 to the fourth heat exchanger 14, and may supply vapor generated from the heat recovery from the regenerated absorbent in liquid form to the compressor 70. The condensate supplied to the fourth heat exchanger 14 may serve as a primary cooling means. In some embodiments, the vapor generated through the primary heat exchange may be supplied to the regeneration tower 30 through compression to about 205 kPa by the compressor 70. The third condensate supply line 513 may supply the condensate generated in the condenser 50 to the compressor 70 and cool the vapor supplied through the second condensate supply line 512. The vapor supplied to the compressor 70 through the second condensate supply line 512 may be supplied to the regeneration tower 30 via compression, wherein the vapor needs to be cooled to an appropriate temperature to suppress thermal denaturation of the absorbent in liquid form in the regeneration tower 30. In some embodiments, the condensate supplied through the third condensate supply line 513 may cool the vapor in the compressor 70 to about 120° C., and then the cooled vapor may be supplied to the regeneration tower 30. According to embodiments of the present invention, the use of the condensate may reduce the reboiler heat duty, so that a total energy requirement for acid gas capture in the acid gas capture system may be effectively reduced.

In some embodiments, the absorbent supply line 12 for transferring the acid gas-absorbed absorbent, and the regenerated absorbent supply line 41 for transferring the regenerated absorbent to the absorption tower 20 via the reboiler 40 connected to the lower part of the regeneration tower 30 may intersect with each other in the second heat exchanger 21, so that the regenerated absorbent in liquid form may be secondarily cooled.

According to another aspect of the present invention, there is provided an acid gas capture method using an absorption tower for absorbing an acid gas discharged from a combustor with an absorbent and a regeneration tower for isolating a processed gas free of the absorbent. The acid gas capture method may include: supplying an exhaust gas including an acid gas to the absorption tower in order to absorb the acid gas with the absorbent; supplying an acid gas-absorbed absorbent discharged from the absorption tower to the regeneration tower to isolate the acid gas from the absorbent; supplying isolated water generated through a water separator to an isolated water supply line; supplying a processed gas discharged from the regeneration tower to a condenser to isolate a condensate from the processed gas; and supplying the condensate generated passing through the condenser to a condensate supply line, wherein the supplying of the condensate may include: cooling the regeneration tower by supplying the condensate generated in the condenser to an upper part of the regeneration tower; cooling a regenerated adsorbent generated in the regeneration tower by supplying the condensate generated in the condenser to a fourth heat exchanger, and supplying generated vapor to a compressor prior to supplying the vapor to the regeneration tower; and cooling the vapor in the compressor by supplying the condensate generated in the condenser to the compressor prior to supplying the vapor to the regeneration tower.

In some embodiments, an operating temperature of the condenser 50 may be from about 30° C. to about 40° C. In some embodiments, the acid gas may be selected from carbon dioxide ($CO_2$), methane ($CH_4$), hydrogen sulfide ($H_2S$), carbonyl sulfide (COS), or mercaptane (RSH, wherein R is a hydrocarbon). However, embodiments are not limited thereto.

While one or more embodiments have been described above with reference to the figures, it will be understood by those of ordinary skill in the art that various changes in form and details may be made therein without departing from the spirit and scope as defined by the following claims.

Unless otherwise defined, terms used herein have the meaning as commonly understood by one of ordinary skill in the art to which this invention pertains. All references, including publications, patent documents, and non-patent documents cited herein are incorporated herein in their entirety by reference.

LIST OF REFERENCE NUMERALS 11. first heat exchanger
12. second heat exchanger
13. third heat exchanger
14. fourth heat exchanger
20. absorption tower
21. absorbent supply line
30. regeneration tower
31. processed gas discharge line
40. reboiler
41. regenerated absorbent supply line
50. condenser
51. condensate supply line
60. water separator
61. exhaust gas supply line
70. compressor
511. first condensate supply line
512. second condensate supply line
513. third condensate supply line

The invention claimed is:

1. An acid gas capture system of saving energy by cooling an absorbent that has passed through a reboiler with a condensate, the system comprising:
    an absorption tower that absorbs the acid gas with an absorbent;
    a regeneration tower that isolates a processed gas free of the absorbent;
    an exhaust gas supply line through which an acid gas-included exhaust gas passed through a first heat exchanger and a water separator is supplied to an absorption tower;
    an absorbent supply line through which the acid gas-absorbed absorbent discharged from the absorption tower is supplied to the regeneration tower through a second heat exchanger;
    a processed gas discharge line through which the processed gas discharged from the regeneration tower is supplied to a condenser via a third heat exchanger; and
    a condensate supply line through which a condensate discharged from the condenser is supplied to regeneration tower,
    wherein the condensate supply line is branched off into three lines comprising: a first condensate supply line through which the condensate generated in the condenser is directly supplied to the regeneration tower;
    a second condensate supply line through which the condensate generated in the condenser is supplied to a fourth heat exchanger and generated vapor is supplied to the regeneration tower via a compressor; and
    a third condensate supply line through which the condensate generated in the condenser is supplied to the compressor to cool the vapor.

2. The acid gas capture system of claim 1, wherein an operating temperature of the condenser is from about 30° C. to about 40° C.

3. The acid gas capture system of claim 1, wherein the acid gas is carbon dioxide ($CO_2$), hydrogen sulfide ($H_2S$), carbonyl sulfide (COS), or mercaptan (RSH, wherein R is a hydrocarbon).

4. The acid gas capture system of claim 1, wherein the absorbent supply line and a regenerated absorbent supply line for transferring a regenerated absorbent to the absorption tower via a reboiler connected to a lower part of the regeneration tower intersect with each other in the second heat exchanger.

5. An acid gas capture method of saving energy by cooling an absorbent that has passed through a reboiler with a condensate by using an absorption tower for absorbing an acid gas with an absorbent and a regeneration tower for isolating a processed gas free of the absorbent, the method comprising:
    supplying an exhaust gas including an acid gas to the absorption tower to absorb the acid gas with the absorbent;
    supplying an acid gas-absorbed absorbent discharged from the absorption tower to the regeneration tower to isolate the acid gas from the absorbent;
    supplying a processed gas discharged from the regeneration tower to a condenser to isolate a condensate from the processed gas; and
    supplying the condensate generated passing through the condenser to a condensate supply line, wherein the supplying of the condensate comprises:

cooling the regeneration tower by supplying the condensate generated in the condenser to an upper part of the regeneration tower;

cooling a regenerated adsorbent generated in the regeneration tower by supplying the condensate generated in the condenser to a fourth heat exchanger, and supplying generated vapor to a compressor prior to supplying the vapor to the regeneration tower; and cooling the vapor in the compressor by supplying the condensate generated in the condenser to the compressor prior to supplying the vapor to the regeneration tower.

6. The acid gas capture method of claim 5, wherein an operating temperature of the condenser is from about 30° C. to about 40° C.

7. The acid gas capture method of claim 5, wherein the acid gas is carbon dioxide ($CO_2$), hydrogen sulfide ($H_2S$), carbonyl sulfide (COS), or mercaptan (RSH, wherein R is a hydrocarbon).

* * * * *